United States Patent [19]

Opperman et al.

[11] Patent Number: 5,634,799
[45] Date of Patent: Jun. 3, 1997

[54] EDUCATIONAL APPARATUS

[75] Inventors: Frankie A. Opperman, Pretoria; Alexis A. F. Wadman, Bedfordview, both of South Africa

[73] Assignee: The South African Mutual Life Assurance Society, Cape Town, South Africa

[21] Appl. No.: 438,389

[22] Filed: May 10, 1995

[51] Int. Cl.⁶ .................................................. G09B 3/00
[52] U.S. Cl. ........................................ 434/345; 434/343
[58] Field of Search .................................... 434/343, 345, 434/327, 364, 348, 334, 346

[56] References Cited

U.S. PATENT DOCUMENTS

| | | | |
|---|---|---|---|
| 2,066,818 | 1/1937 | Beall | 434/327 |
| 2,213,411 | 9/1940 | Rippon | 434/345 |
| 2,221,303 | 11/1940 | Shipley | 434/345 |
| 2,509,405 | 5/1950 | Zimmerman | 434/346 |
| 2,720,038 | 10/1955 | Clark | 434/343 |
| 3,214,847 | 11/1965 | Dorsett et al. | 434/346 |
| 3,705,462 | 12/1972 | Mansfield | 434/343 |
| 3,798,792 | 3/1974 | Askew | 434/345 |
| 4,526,550 | 7/1985 | Lurito | 434/345 |

FOREIGN PATENT DOCUMENTS 1437895  11/1988  U.S.S.R. .................. 434/345

*Primary Examiner*—Paul J. Hirsch
*Attorney, Agent, or Firm*—Ladas & Parry

[57] ABSTRACT

Educational apparatus (10) is provided which includes a base member (11) having a plurality of compartments (14) and a plurality of guide channels (50) define therein. Each guide channel (50) interconnects at least two adjacent compartments (14) forming a selection arrangement (51). The apparatus (10) also includes a plurality of tokens (22) and each token (22) is associated with a selection arrangement (51) and locatable in a selected compartment (14) by a user in response to audible or visual observations by the user. The apparatus (10) also has marking means (24) for assessing in use the location of each token (22).

15 Claims, 11 Drawing Sheets

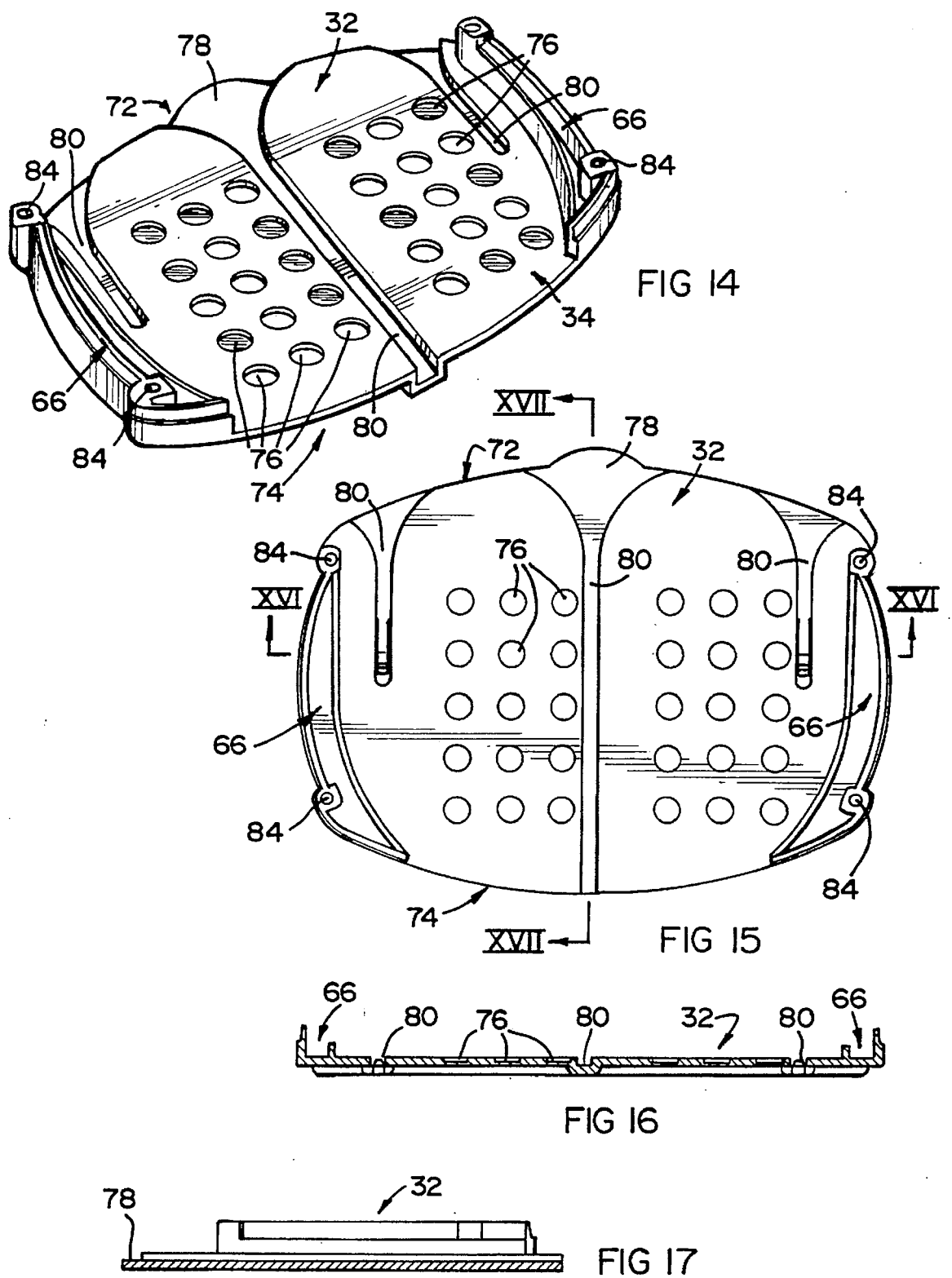

EDUCATIONAL APPARATUS

FIELD OF THE INVENTION

THIS INVENTION relates to an educational apparatus.

For the purposes of this specification the term "educational apparatus" includes games and the like.

SUMMARY OF THE INVENTION

According to the invention, there is provided educational apparatus which includes a base member having a plurality of selection arrangements, each selection arrangement being formed by at least two compartments located in the base member;

a plurality of tokens, each token being operatively associated with a selection arrangement and being locatable in a selected compartment of the selection arrangement; and marking means for assessing the location of each token within the selection arrangement, which location is selected by a user.

The marking means may be in the form of a marking board having a plurality of apertures selectively located therein, each aperture corresponding to a selection arrangement and configured to identify a token placed in a predetermined position in the selection arrangement in use.

The educational apparatus may include a cover board which is locatable between the base member and the marking means, the cover board being displaceable between an operative position in which tokens are supported by the cover board and an inoperative position in which the tokens are not supported.

The educational apparatus may include holding means attached to the base member, the holding means defining a cavity in which the marking means and the cover board are receivable and held in use.

The holding means and the cover board may have complementary guide formations thereby to guide displacement of the cover board between its operative and inoperative positions.

The holding means and the marking means have complementary guide formations for guiding location of the marking means relative to the base member.

The educational apparatus may include a plurality of guide channels, each guide channel interconnecting at least two adjacent compartments of a selection arrangement.

The educational apparatus may include checking formations for operatively checking displacement of the cover board from its operative position when each token is not located in a compartment.

The cover board may include a plurality of apertures corresponding in number to the number of compartments, the cover board being configured so that each aperture is in register with a compartment when the cover board is in its inoperative position.

The selection arrangements may be arranged in parallel rows.

Each token may have a retaining formation for retaining the token within its associated selection arrangement.

The educational apparatus may include printed matter including a plurality of questions associated with a particular marking means.

The invention extends to a marking board for use in educational apparatus as hereinbefore described, the marking board including a body portion having a plurality of apertures defined therein, each aperture being located in a preselected position and configured in use to identify a particular location of a token of the apparatus;

a plurality of indicators provided on the body portion for indicating a predetermined orientation of the marking board relative to a base member of the apparatus; and guide formations for guiding location of the marking board relative to the base member.

Further according to the invention, there is provided educational apparatus which includes a base member having a plurality of selection arrangements, each selection arrangement being formed by at least two compartments which are defined in the base member and configured to receive tokens in use; and marking means for assessing the location of a token within each selection arrangement.

BRIEF DESCRIPTION OF THE DRAWINGS

The invention is now described, by way of example, with reference to the accompanying diagrammatic drawings in which:

FIG. 14 shows a three-dimensional view of a holder of the apparatus of FIG. 6;

FIG. 15 shows a top plan view of the holder of FIG. 14;

FIG. 16 shows a longitudinal sectional view of the holder taken at XVI—XVI in FIG. 15;

FIG. 17 shows a cross-sectional view of the holder taken at XVII—XVII in FIG. 15;

DETAILED DESCRIPTION OF THE DRAWINGS

Figure 1:
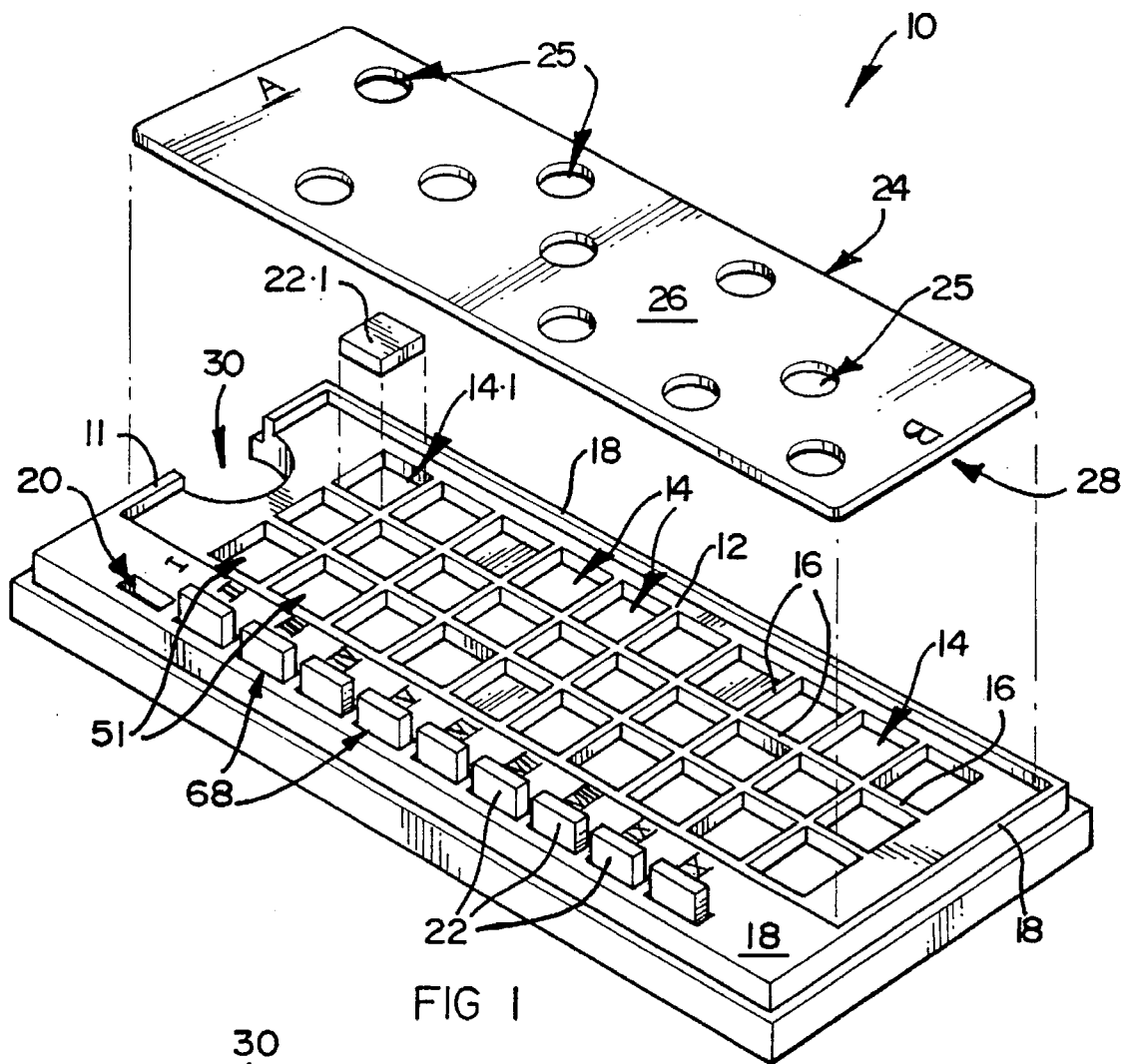
FIG. 1 shows a three-dimensional exploded view of an embodiment of an educational apparatus in accordance with the invention.
Figure 2:
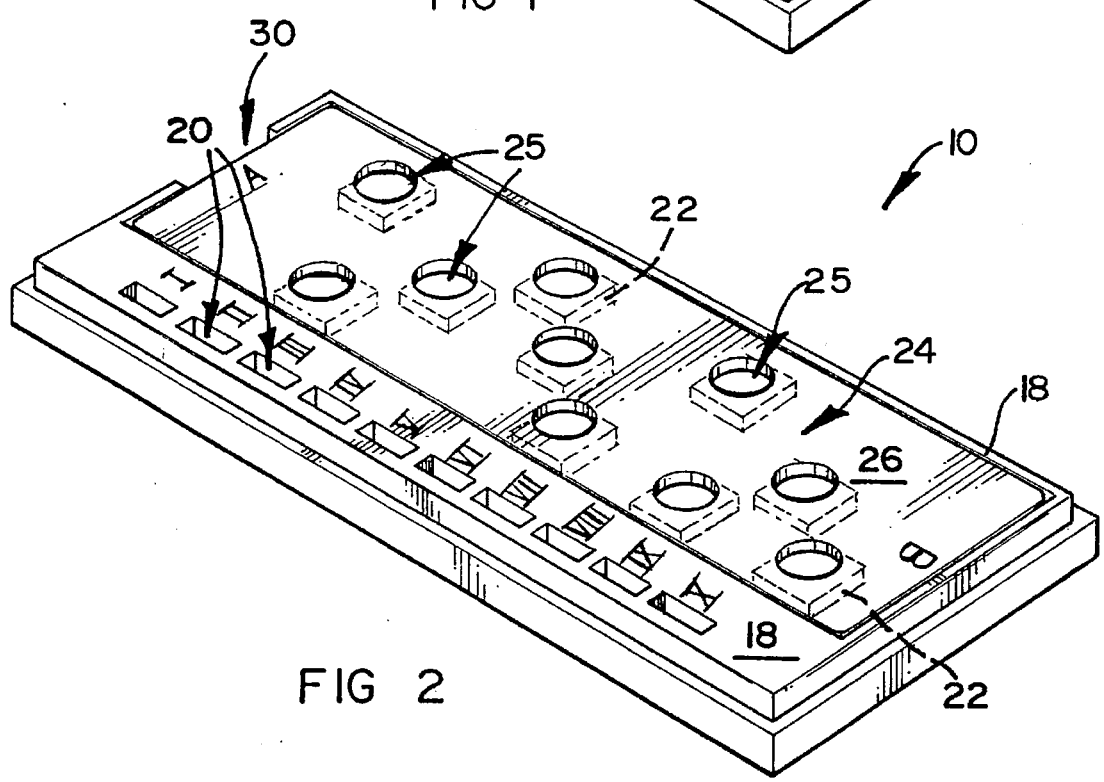
FIG. 2 shows a three-dimensional assembled view of the apparatus of FIG. 1 with tokens located on a work surface of a base member and with a marking board placed in its operative position above the work surface.

Referring to FIGS. 1 and 2 of the drawings, reference numeral 10 generally indicates an educational apparatus in accordance with the invention for carrying out question and answer sessions as will be discussed later in the description.

The apparatus 10 is of an elongate rectangular shape and includes a base member 11 having a flat upwardly directed work surface 12 sub-divided into a number of upwardly open compartments 14. In FIG. 1, the work surface 12 is depicted having the compartments 14 located in an array of ten abutting parallel rows or selection arrangements 51 designated I to X, each selection arrangement 51 having three compartments 14. Each compartment 14 is square in shape and is defined by walls 16.

The apparatus 10 also includes ten planar square-shaped tokens 22. The sizes of the tokens 22 are such that they can fit removably into the compartments 14.

The base member 11 has a periphery defined by a raised peripheral rim 18 around the work surface 12. A side of the rim 18 has ten recesses 20 defined therein for receiving the tokens 22 in their standby positions 68. Each recess 20 is rectangular in outline when seen in plan view.

The apparatus 10 further includes a planar marking board 24. The board 24 is rectangular in outline and has ten round apertures 25 located therein. The apertures 25 are located in the board 24 in a predetermined configuration wherein each aperture 25 corresponds to a correctly placed token 22. The marking board 24 has a flat upper surface 26 and a flat lower surface 28. The upper surface has an end designated 'A' and the opposite end is designated 'B'. In similar fashion, the lower surface 28 has an end 'C' and an end 'D'.

The base member 11 is provided with a crescent-shaped recess 30 at one end thereof to facilitate gripping the marking board 24 when the board is positioned over the work surface 12 and within the peripheral rim 18 of the base member 11.

Figure 3:
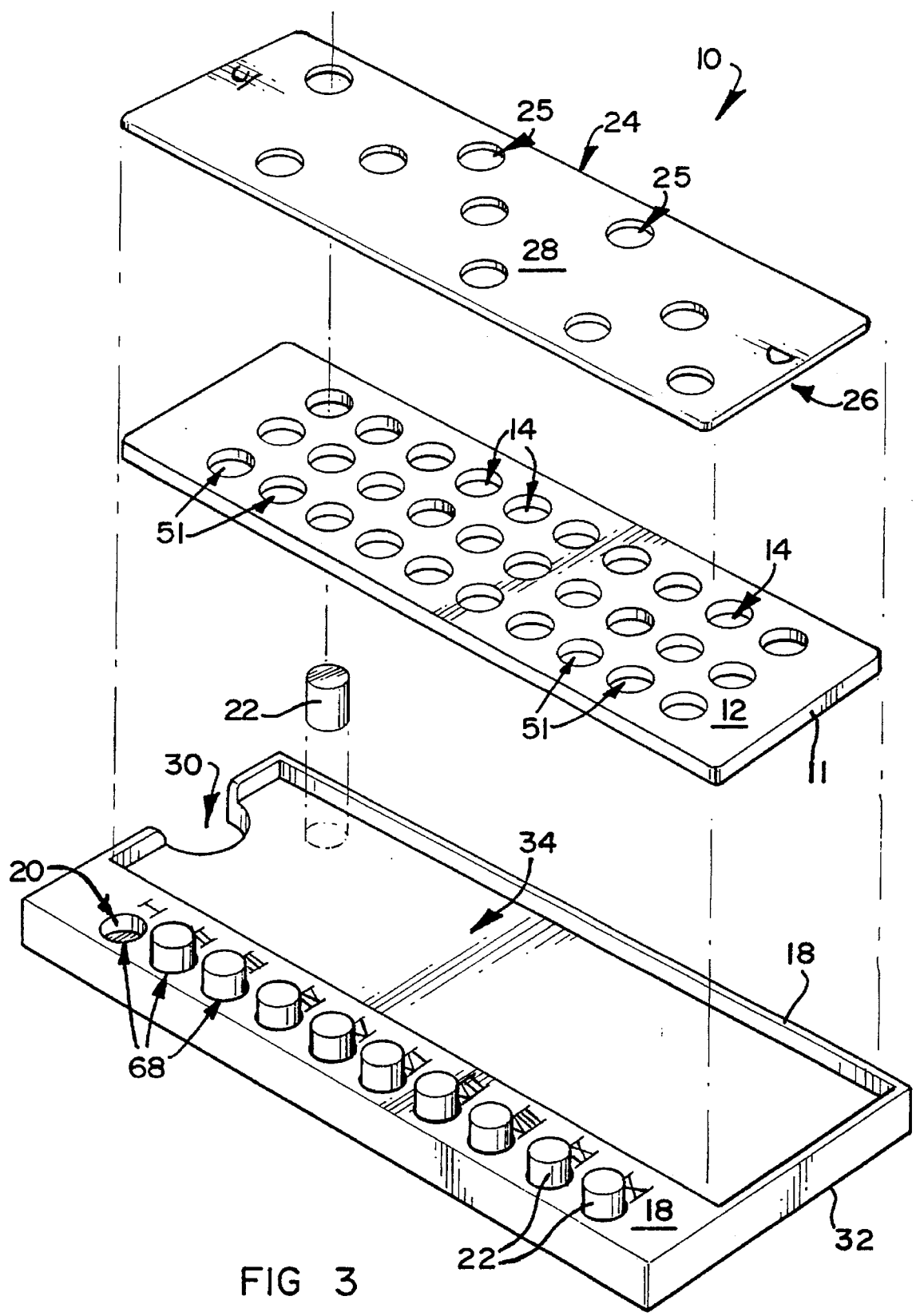
FIG. 3 shows an exploded three-dimensional view of another embodiment of an educational apparatus and marking board in accordance with the invention.
Figure 4:
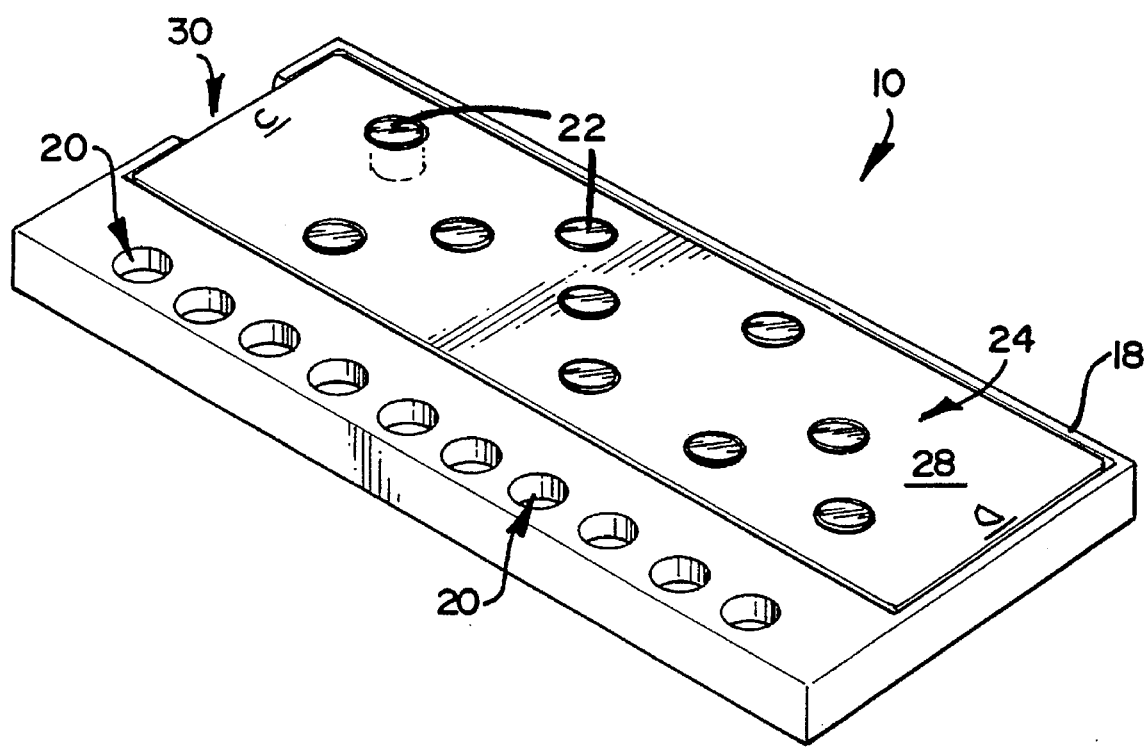
FIG. 4 shows an assembled view of the apparatus of FIG. 3, with the tokens located in selected compartments and the marking board placed in position over the-working surface of the base member.

Referring to FIGS. 3 and 4, the same reference numerals designate the same parts as depicted in FIGS. 1 and 2 unless otherwise specified. The main differences between FIGS. 1 and 2 and FIGS. 3 and 4, is that in FIGS. 3 and 4 the tokens 22 are of round cylindrical shape with the complementary token receiving recesses 20 being circular in outline. Furthermore, the work surface 12 is provided on a base member 11 which is removable from a holder 32 of the apparatus 10 with the compartments 14 being in the form of apertures extending through the base member 11 and being circular in outline. The rim 18 in this embodiment is provided on the holder 32 and not on the base member 11 as in FIGS. 1 and 2. A cavity 34 is defined in the holder 32 by the rim 18 in which the base member 11 is removably locatable.

Figure 5:
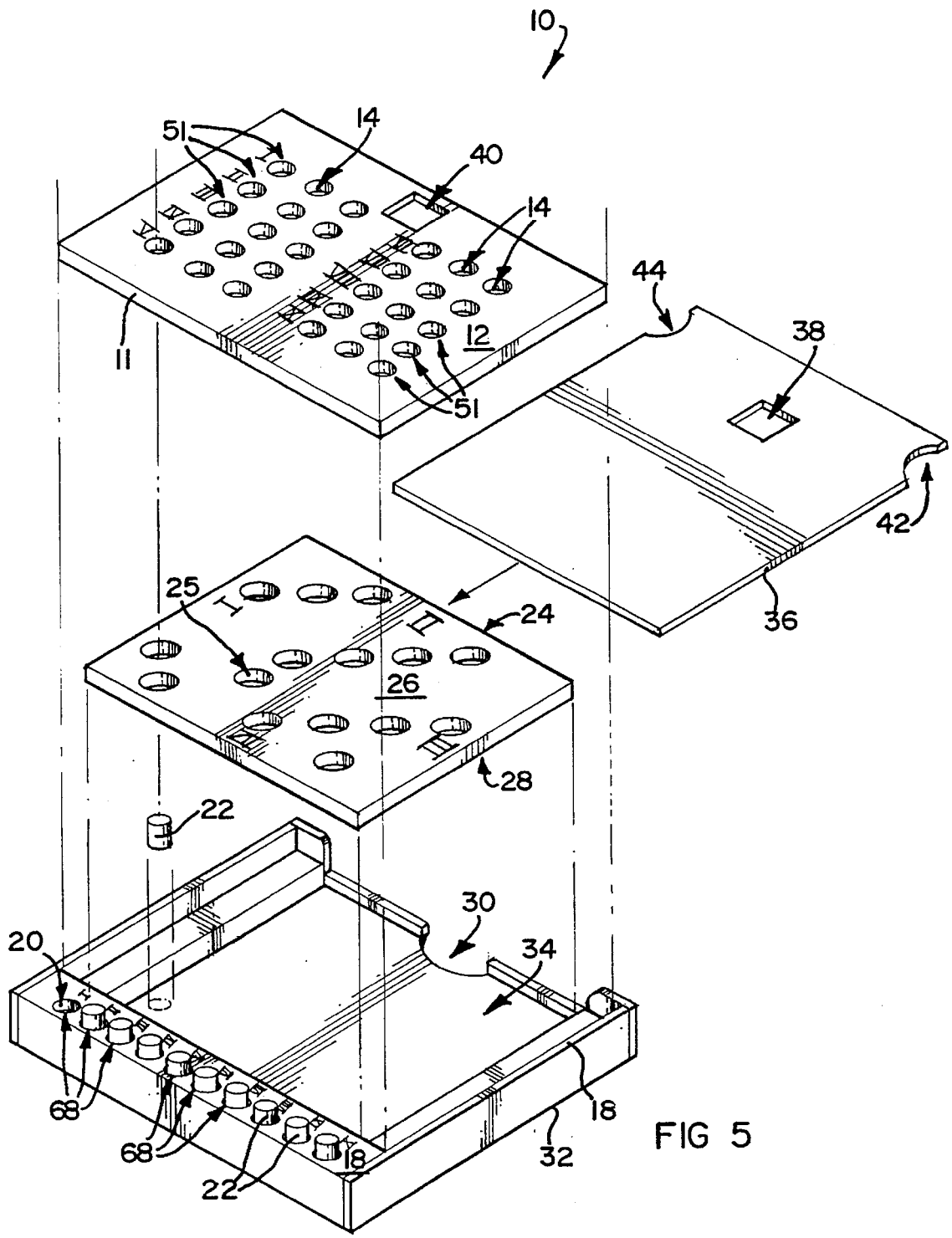
FIG. 5 shows an exploded three-dimensional view of a further embodiment of an educational apparatus, in accordance with the invention.
Figure 6:
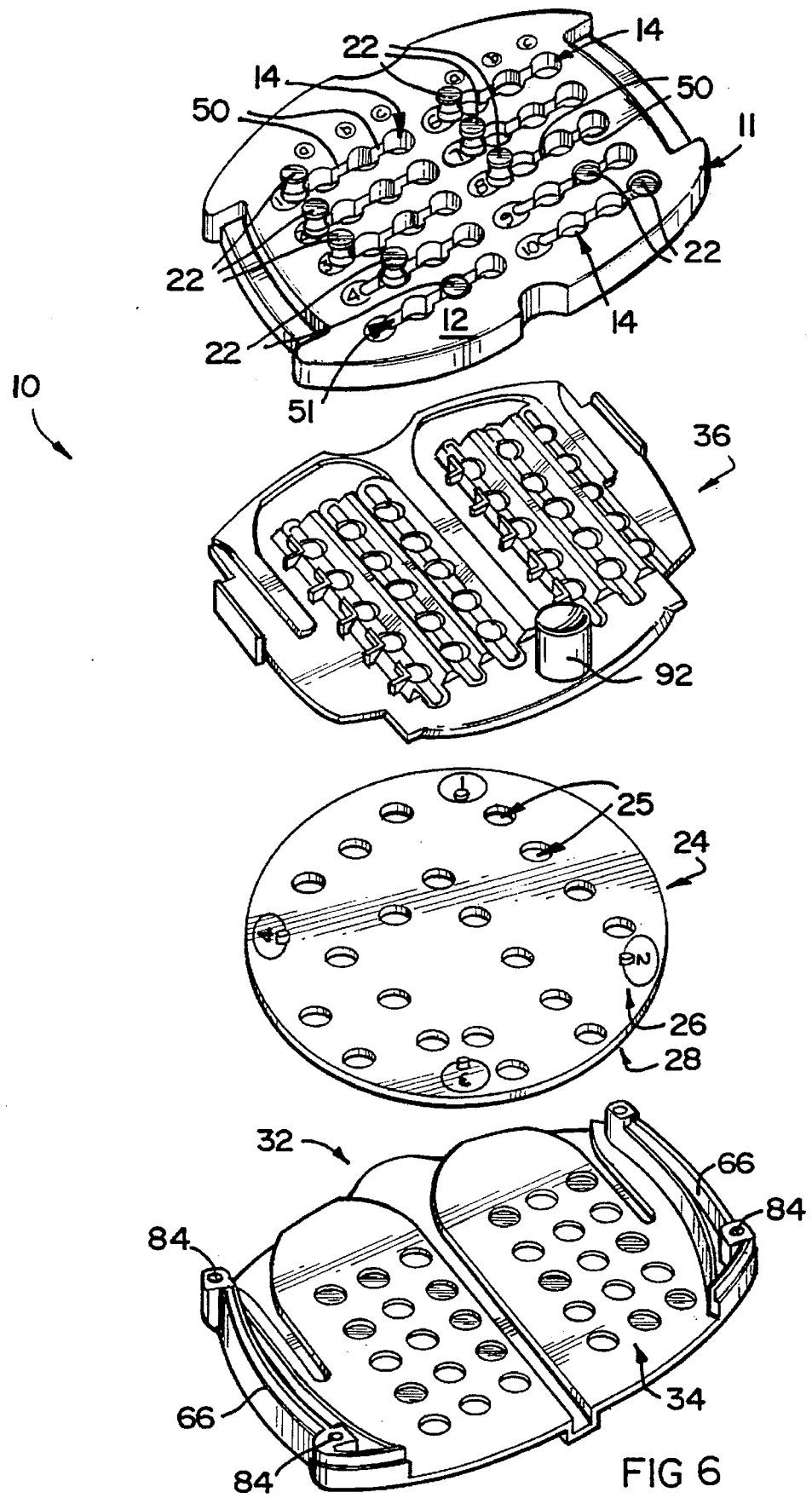
FIG. 6 shows an exploded three-dimensional view of a further embodiment of educational apparatus in accordance with the invention.
Figure 7:
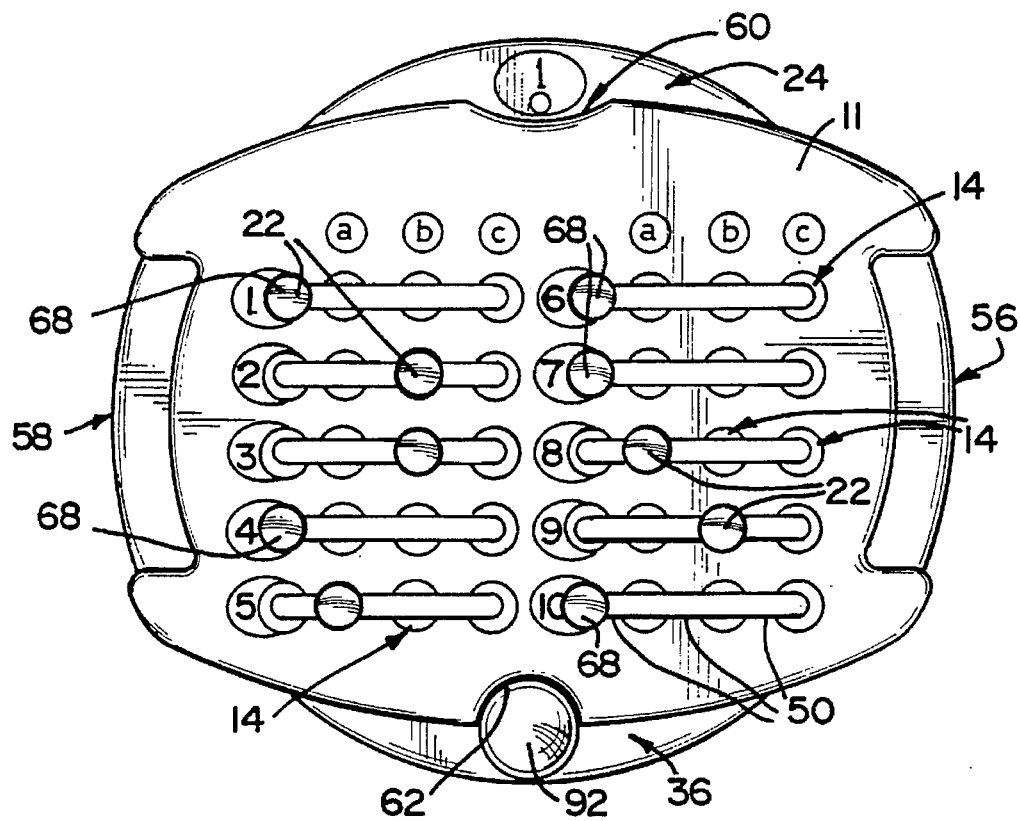
FIG. 7 shows a top plan view of the apparatus of FIG. 6.

Referring to FIG. 5, the same reference numerals designate the same or similar parts as depicted in FIGS. 3 and 4 unless otherwise specified. The main difference between FIGS. 3 and 4 and FIG. 5, is that in FIG. 5 the apparatus 10 is provided with a cover board 36 which is operatively located within the holder 32. The cover board 36 is rectangular in outline and has a square aperture or hole 38 located therein. The cover board 36 is provided with two crescent-shaped indentations 42, 44 on opposite sides to one another to facilitate removal of the cover board 36 from the holder 32.

The upper surface 26 of the marking board 24 has a side designated "I", a side designated "II", a side designated "III", and a side designated "IV". In similar fashion, the lower surface 28 has a side "V", a side "VI", a side "VII" and a side "VIII" (not shown). Furthermore, the work surface 12 is also provided with a square aperture or hole 40 located therein. The work surface 12 has compartments 14 located in two groups of five abutting parallel rows of three compartments 14.

The marking board 24 is operatively located within the cavity 34 of the holder 32 with the cover board 36 being locatable on top of the marking board 24 thereby to cover apertures 25 in the marking board 24. The work surface 12 is located on top of the cover board 36. The cover board 36 is displaceable between its operative position in which it covers the marking board 28 and support tokens 22 that are placed in selected compartments, and its inoperative position in which the tokens 22 are free to fall under gravity into the apertures 25.

Figure 27:
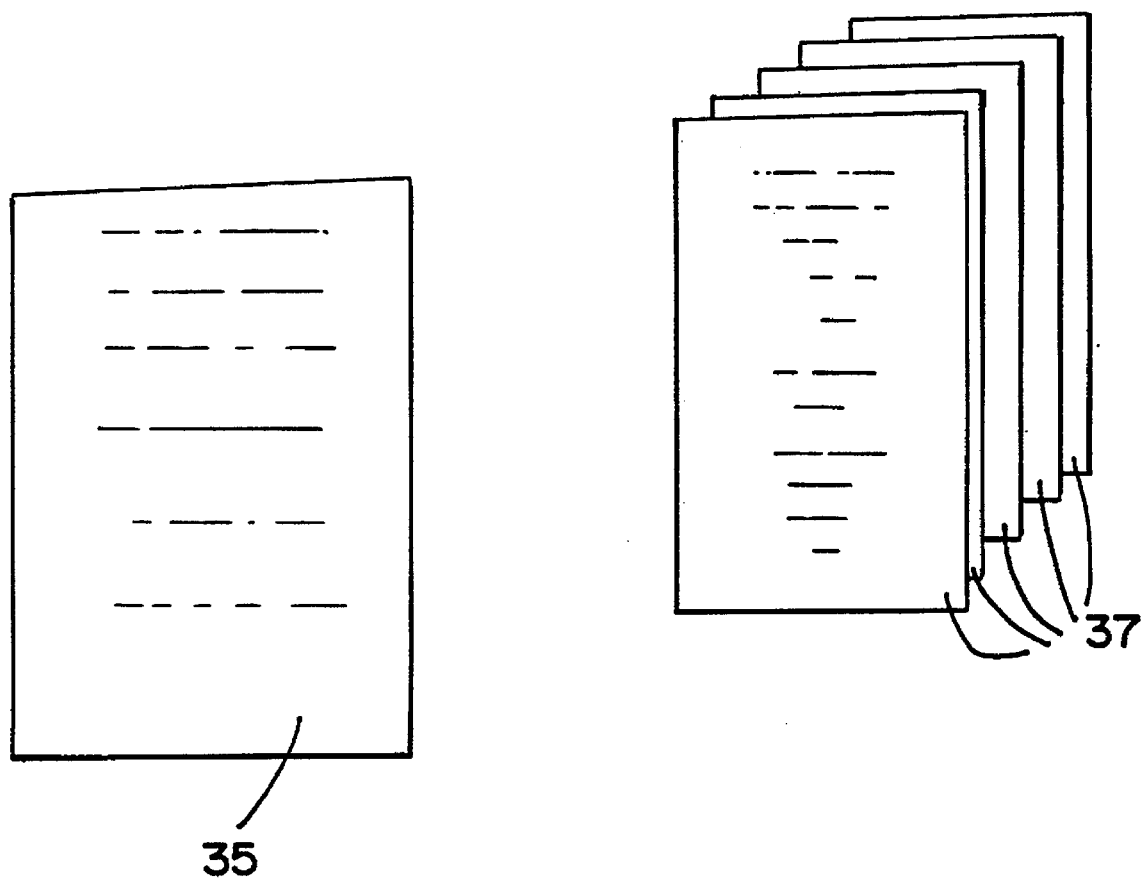
FIG. 27 shows a schematic representation of instructions and question cards used with the educational apparatus.

The apparatus 10 also includes a cover (not shown) and a set of instruction cards 35 and question cards 37 (see FIG. 27). Instead, instructions and questions may be in the form of a book (not shown).

Referring to FIGS. 1–4, in use, the apparatus 10 is placed on any suitable surface and its cover is removed. A user, after reading the instructions cards 35, selects a question card 37 having a series of ten questions printed thereon, each question corresponding to a selection arrangement 51 or row of compartments designated I-X. Each question has three possible answers, each answer corresponding to one of the compartments 14 in each row.

The user or pupil starts with the tokens 22 located in the recesses 20 and begins with question 1 on the question card 37. The user removes the token 22 from the recess 20 corresponding to question 1 and places it, according to his or her judgement, in the relevant compartment 14 corresponding to the answer selected (as illustrated by token 22.1 being placed in compartment 14.1 of FIG. 1). Similarly, the remaining questions II to X are answered in accordance with the instructions and questions. Should the user thereof change his mind in regard to a question before the end of a question session, the construction of the apparatus 10 facilitates the removal and repositioning of the relevant token 22.

At the end of the question session, an invigilator or teacher can quickly and easily ascertain the score of the user thereof by placing the marking board 24 corresponding to the question card 37 selected, on top of the work surface 12 of the base member 11 (FIGS. 1 and 2) or on top of the base member 11 which fits in the holder 32 (FIG. 3), and count the number of correctly placed tokens visible through the apertures 25. It will be understood that the marking board 24 can be placed in four different orientations on the work surface 12 by turning it over and turning it around. In other words, if the set of questions and answers correspond to, for example, the configuration of the board surface 26 'A', then the marking board 24 is placed with the surface 26 uppermost with end 'A' at the end of the apparatus 10 proximate the crescent shaped recess 30. Thus, the teacher need merely count the tokens 22 visible through the apertures 25 to determine the score obtained by the user or pupil of the apparatus 10. Naturally, numerous marking boards 24 can be provided with each marking board 24 enabling four sets of questions to be marked or scored. The crescent-shaped recess 30 facilitates removal of the board 24 and base member 11 from the apparatus 10.

It will be understood that before the embodiment of the apparatus 10 shown in FIGS. 3 and 4 is used, the base member 11 is placed to seat in the cavity 34 in the holder 32. The tokens 22 are then selectively placed in the compartments 14 in the manner described above.

The educational apparatus 10 can involve additional or alternative rules while still complying with the general principles outlined above. Furthermore, the specific configuration of the apparatus 10 can also vary in various different respects, while still incorporating the features described above.

Referring to FIG. 5, in use, the marking board 24 is placed in the cavity 34 in the holder 32. The cover board 36 is then placed on top of the marking board 24 thereby covering the marking board 24 thereby covering the marking board 24 and the base member 11 is placed on top of the cover board 36. The cover board 36 prevents a user of the apparatus 10 from seeing the correct location of the tokens 22 corresponding to correct answers on the marking board 24 and provides a support surface for the tokens 22 inserted into selected compartments 14. The hole 38 in the cover board 36 corresponds to the hole 40 in the work surface 12 of the base member 11 to allow the user thereof to ascertain from the marking board 24, for example the configuration of the board surface 26 "II", which set of questions to answer. The user of the apparatus 10 answers the questions in the same manner as explained above for FIGS. 1–4. At the end of the question session, the invigilator or teacher can quickly and easily ascertain the score of the user of the apparatus 10 by removing the board 36 in sliding fashion from between the marking board 24 and the base member 11 so that the board 36 no longer provides a support surface to the tokens 22. The tokens 22 corresponding to the correct answers will then drop from the base member 11 into the apertures 25 and, the teacher need merely count the tokens 22 which have dropped to determine the score obtained by the user of the apparatus 10. In similar fashion to the marking boards 24 of FIGS. 1–4, numerous arrangements of the compartments 14 can be provided on a number of marking boards 24.

Referring to FIGS. 6 to 26 of the drawings, reference numeral 10 generally indicates a further embodiment of an educational apparatus in accordance with the invention for carrying out question and answer sessions. The embodiment depicted in FIGS. 6 to 26 is similar to the embodiments depicted in FIGS. 1 to 5 and the same reference numerals have been used to indicate the same or similar features unless otherwise indicated.

The apparatus 10 includes a base member 11, a plurality of tokens 22, a cover board 36, a marking board 24, and a holder 32. The base member 11 has ten selection arrangements 51 formed by compartments 14 which are interconnected by guide channels 50. In use, the tokens 22 are located by a user in an appropriate compartment 14 in response to audible or visual observations by the user.

Figure 11:
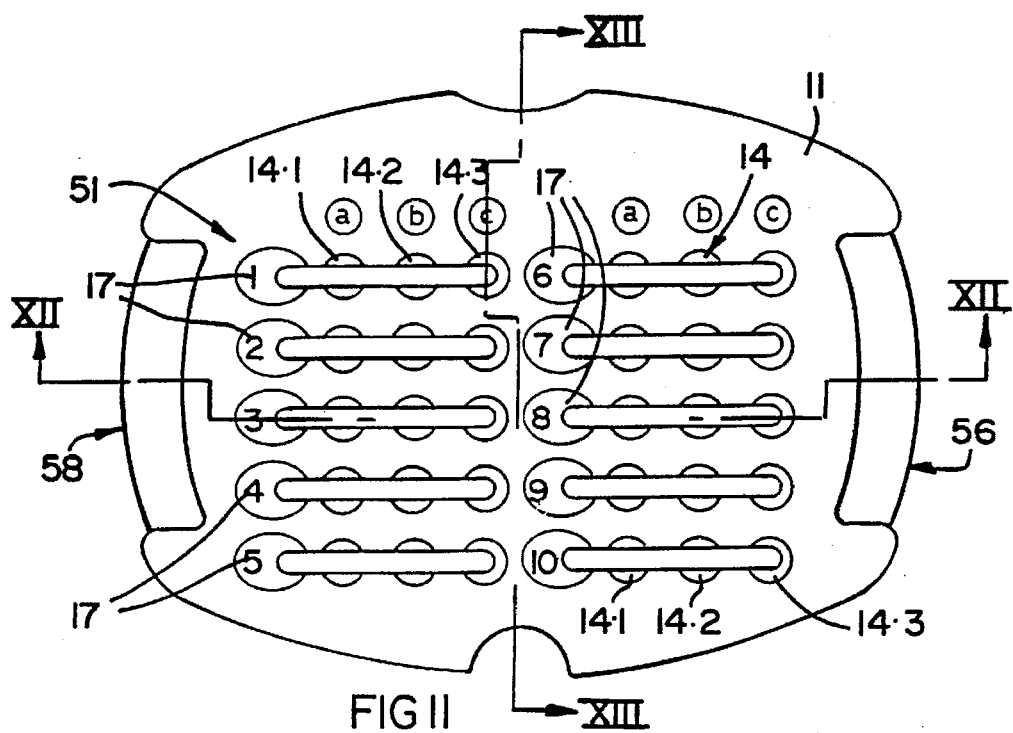
FIG. 11 shows a top plan view of the base member of FIG. 10.
Figure 12:
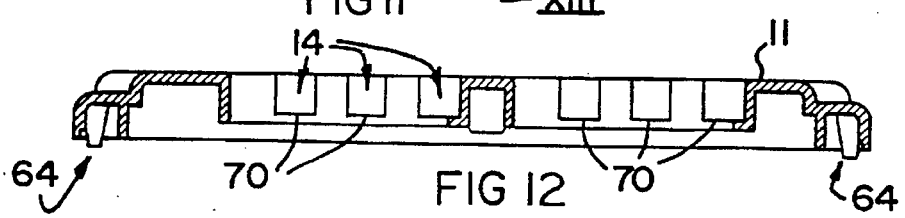
FIG. 12 shows a longitudinal sectional view of the base member taken at XII—XII in FIG. 11.
Figure 13:
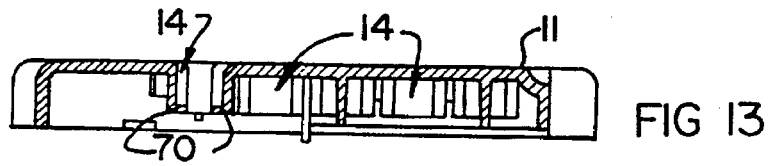
FIG. 13 shows a cross-sectional view of the base member taken at XIII—XIII in FIG. 11.
Figure 18:
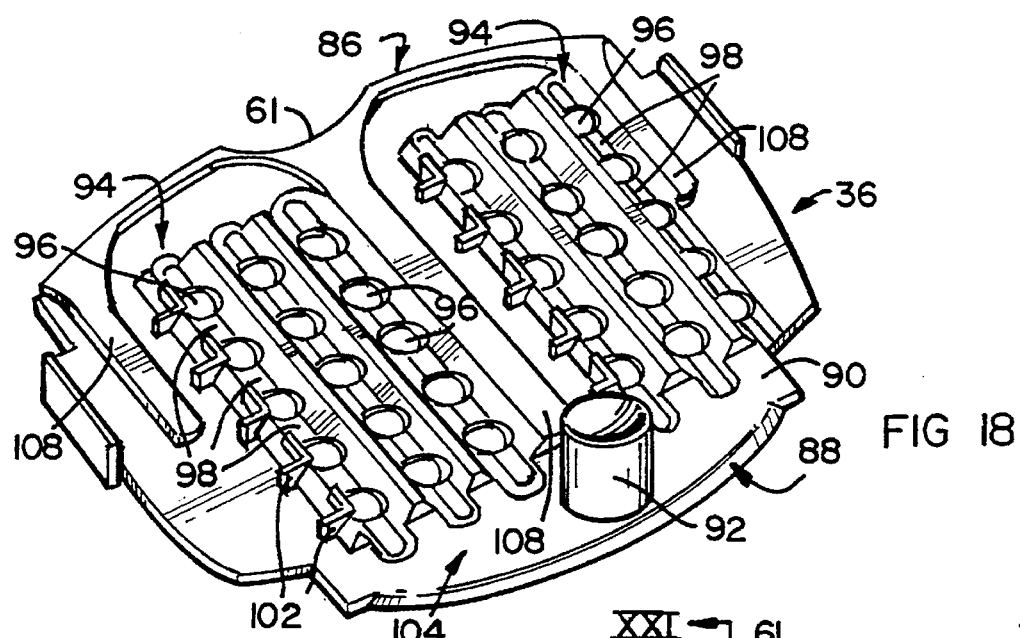
FIG. 18 shows a three-dimensional view of a cover board of the apparatus of FIG. 6.
Figure 19:
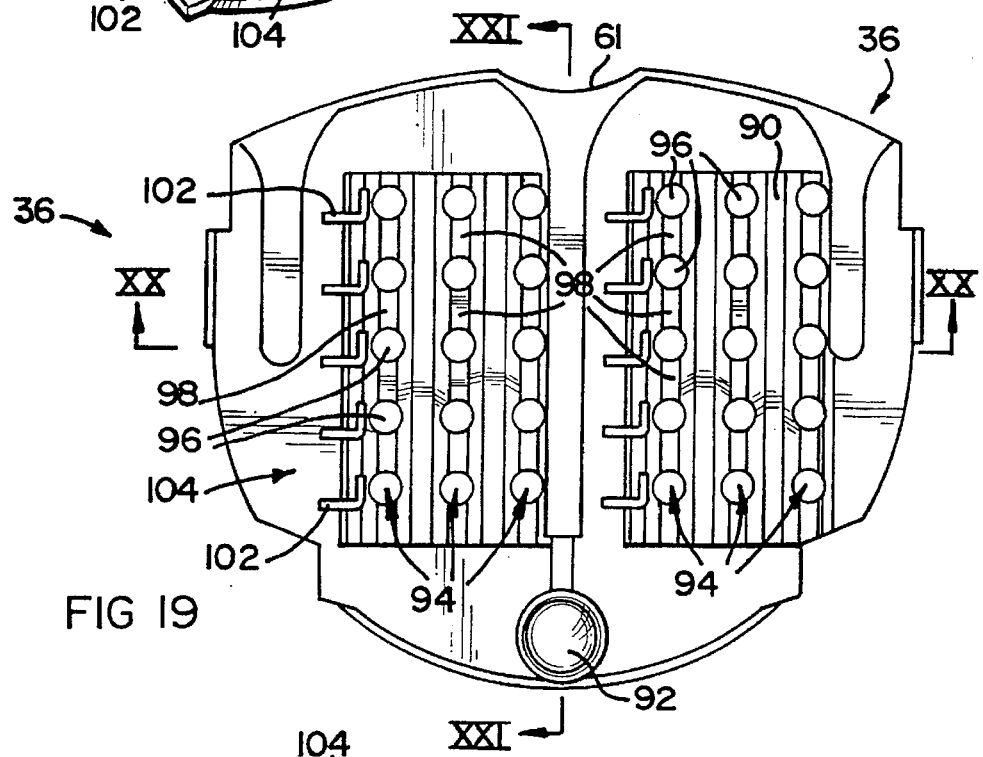
FIG. 19 shows a top plan view of the cover board of FIG. 18.
Figure 20:
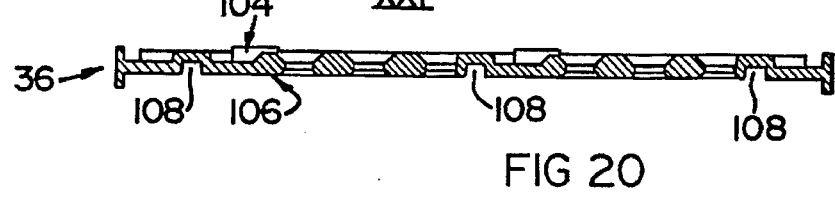
FIG. 20 shows a longitudinal sectional view of the cover board taken at XX—XX in FIG. 19.
Figure 21:
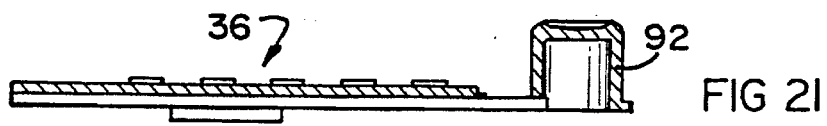
FIG. 21 shows a cross-sectional view of the cover board taken at XXI—XXI in FIG. 19.
Figure 22:
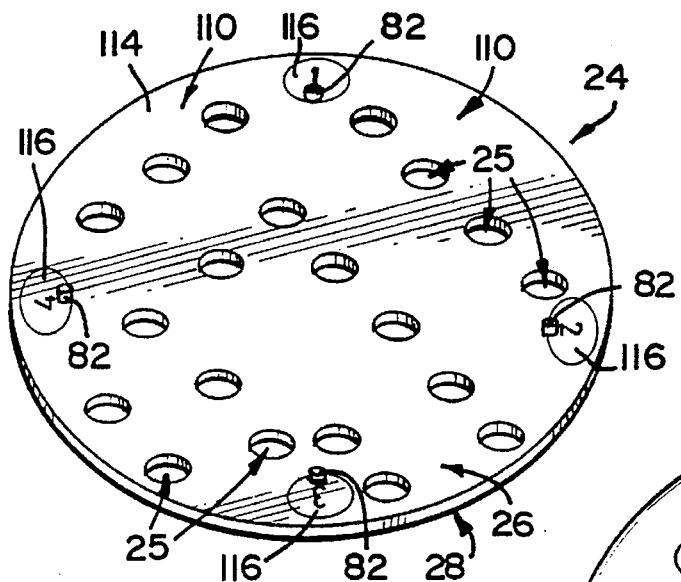
FIG. 22 shows a three-dimensional view of a marking board of the apparatus of FIG. 6.
Figure 26:
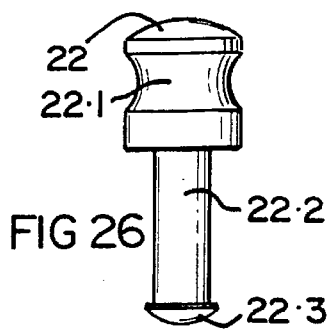
FIG. 26 shows a pictorial view of a token of the apparatus of FIG. 6.
Figure 23:
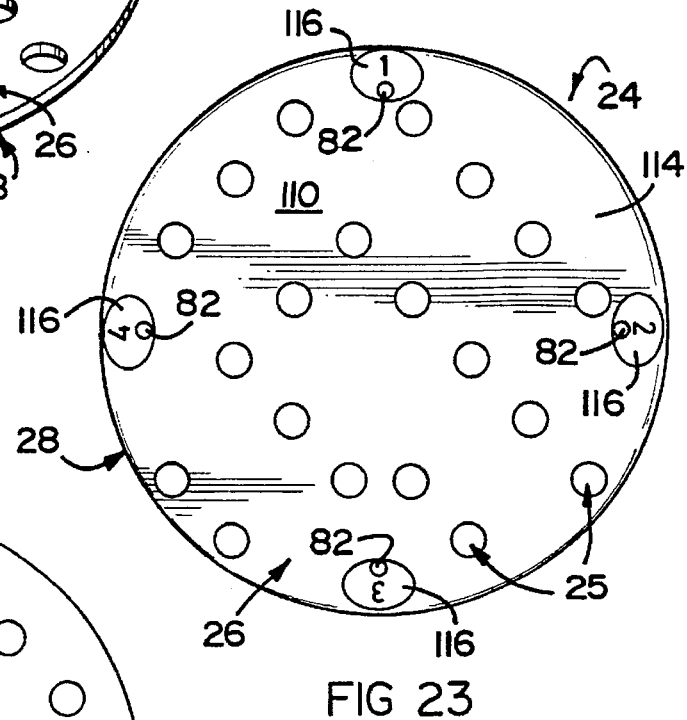
FIG. 23 shows a top plan view of the marking board of FIG. 22.
Figure 24:
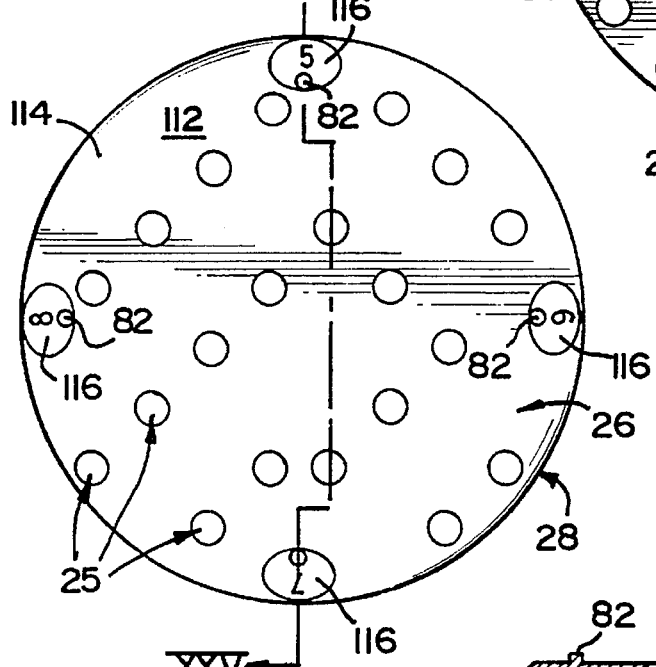
FIG. 24 shows a bottom plan view of the marking board of FIG. 22.
Figure 25:
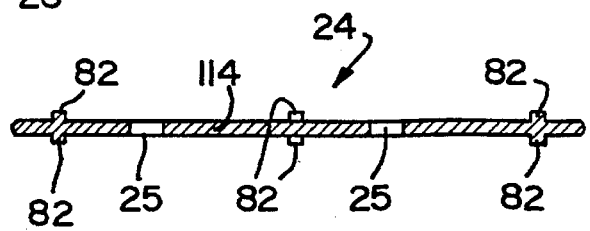
FIG. 25 shows a cross-sectional view of the marking board taken at XXV—XXV in FIG. 24.

The compartments 14 are arranged in two sets of five abutting parallel rows or selection arrangements 51, each row having three compartments 14.1, 14.2 and 14.3 (see FIG. 11). The rows or selection arrangements 51 are designated 1 to 10 by markings 17 and each compartment 14 within each row is designated A, B or C (see FIGS. 7 and 11). The three compartments 14.1, 14.2 and 14.3 (see FIG. 11) in each row or selection arrangement 51 are interconnected by the guide channels 50 thereby defining a path of travel along which an associated token 22 is selectively displaced in use. Each token 22 (see FIG. 26) has an enlarged gripping portion 22.1, a stem 22.2, and a retaining formation 22.3 which holds the token 22 captive within each row or selection arrangement 51. It is to be appreciated however that any number of selection arrangements 51 may be provided and that a greater or lesser number of compartments 14.1, 14.2, 14.3 may also be provided. The shape and configuration of the tokens 22 can also vary.

The base member 11 is generally rectangular in shape having generally rounded first and second sides 52, 54 respectively (see FIG. 10) and generally rounded ends 56, 58. The first and second sides 52, 54 respectively have crescent shaped indentations 60, 62 respectively. Indentation 60 facilitates grasping of the marking board 24 (see FIG. 7) thereby to facilitate removal thereof from the holder 32 and, indentation 62 is configured to facilitate removal of the cover board 36.

The holder 32 (see FIGS. 14 to 17) is complemental in shape to the base member 11 and has first and second rounded sides 72, 74 which correspond with first and second sides 52, 54 (see FIG. 10) respectively of the base member 11. The base member 11 has groove formations 64 (see FIGS. 8 and 12) which extend along the rounded ends 56, 58. The groove formations 64 engage with complementary tongue formations 66 (see FIGS. 8 and 14) of the holder 32 thereby to attach the holder 32 to the base member 11 and define a cavity 34 which receives the marking board 24 and the cover board 36.

Standby positions 68 (shown in FIGS. 7 and 10) are provided on the base member 11 in which positions the tokens 22 are placed prior to carrying out a question and answer session and thus prior to being located in a selected compartment 14 by a user of the educational apparatus 10.

Figure 8:
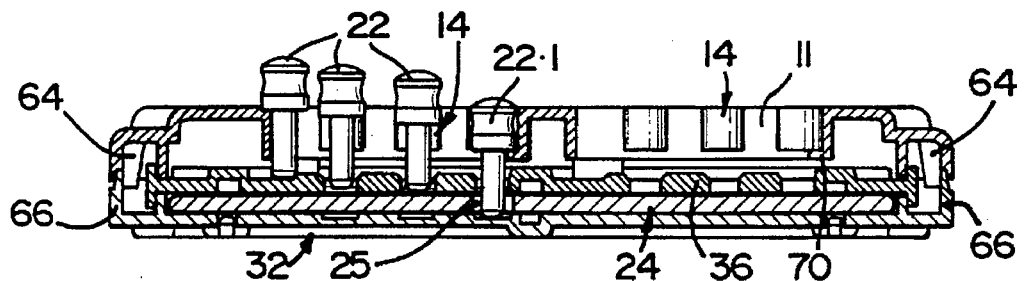
FIG. 8 shows a longitudinal partly sectional view of the apparatus of FIG. 6.
Figure 9:
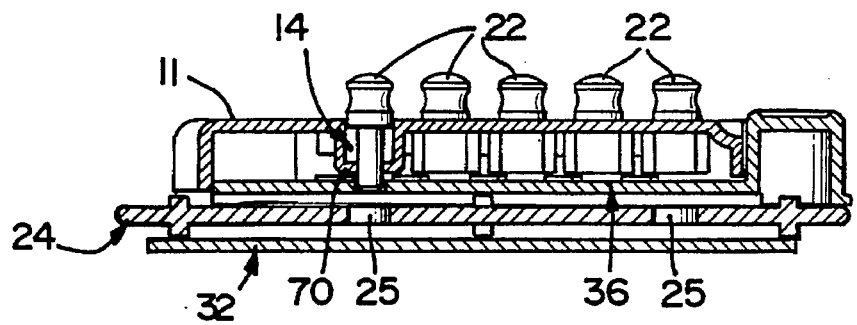
FIG. 9 shows a partly cross-sectional view of the apparatus of FIG. 6.
Figure 10:
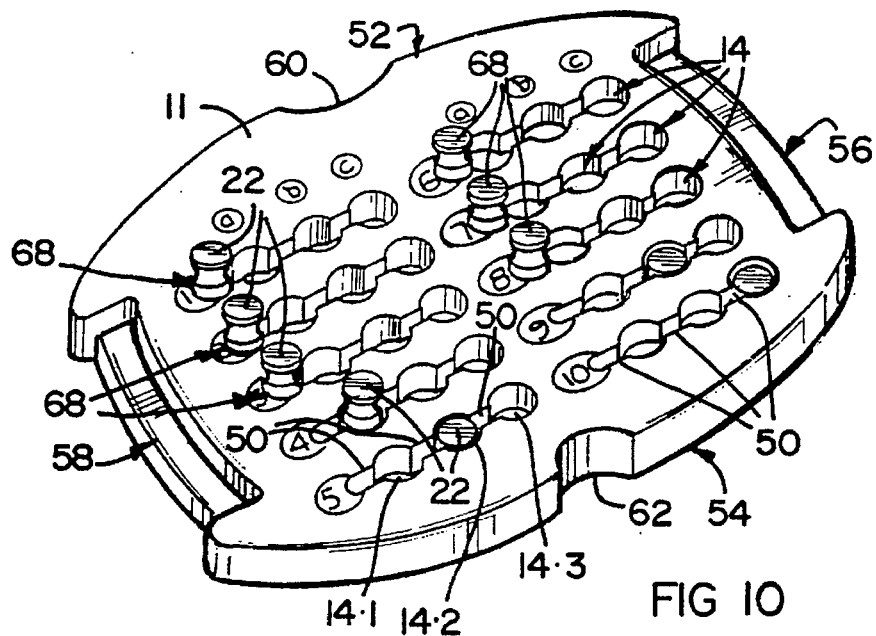
FIG. 10 shows a three-dimensional view of a base member of the apparatus of FIG. 6.

The compartments 14 are cylindrical in shape and of slightly greater diameter than the gripping portion 22.1 of the tokens 22 to enable the gripping portion 22.1 to be received therein with clearance (see FIG. 8). A gripping portion 22.1 that is received within a compartment 14 is indicative of a correctly placed token 22, and this is described in more detail below.

Each compartment 14 has a lower retaining lip 70 (see FIG. 12 and 13) which defines a surface against which the retaining formation 22.3 of the token 22 abuts thereby to hold each token 22 captive within its associated row of compartments 14 and guide channels 50.

The holder 32 has recesses 76 (see FIGS. 14 to 16) which are in register with the compartments 14 when the apparatus 10 is assembled. The recesses 76 receive end portions of the stem 22.2 of the tokens 22 when such tokens 22 have been placed in the correct positions in the array of compartments 14. This allows the gripping portions 22.2 of correctly placed tokens 22 to drop to a lower level thereby to distinguish more clearly between tokens 22 which are placed in predetermined correct positions and tokens 22 which are not in correct positions. The recesses 76 allow a more compact construction of the educational apparatus 10. The holder 32 also has a lip 78 which protrudes from the side 72 of the holder 32.

The holder 32 has guides 80 (see FIGS. 14 to 16) which are integrally formed therein and which assist in guiding protuberances 82 of the marking board 24 (see FIG. 25) thereby to facilitate insertion of the marking board 24 within the cavity 34 and thus ensure appropriate orientation of the marking board 24 relative to the compartments 14 in the base member 11. Four bores 84 (see FIGS. 14 and 15) are provided in the holder 32 to assist in securing it to the base member 11 by means of self-tapping screws (not shown) which extend from a lower side of the holder 32, through the bores 84, and are screwed into complementary bores (not shown) in the base member 11. In certain circumstances, an alternating clipping mechanism (not shown) is provided to secure the holder 32 to the base member 11.

The cover board 36 (see FIGS. 18 to 21) is of generally similar shape to both the base member 11 and the holder 32 having a rounded side 86 corresponding to rounded sides 72 and 52 of the holder 32 and the base member 11 respectively. Likewise, the cover board 36 has a second rounded side 88 which is of generally similar shape to the rounded sides 74 and 54 of the holder 32 and the base member 11 respectively. The cover board 36 has a generally planar body portion 90 (see FIG. 18) and a knob 92, formed integrally therewith, and which protrudes transversely from the body portion 90.

Six spaced parallel rows 94, corresponding to the number of compartments 14 in each selection arrangement 51, are provided wherein each row 94 has five aligned apertures 96 interconnected by support surfaces 98. The parallel rows 94 run transversely to the parallel rows of compartments 14 and the cover board 36 is arranged so that it is selectively displaceable within the cavity 34 between an inoperative position in which the apertures 96 are in register with the compartments 14, and an operative position in which the apertures 96 are out of register with the compartments 14. When the apertures 96 are out of register with the compartments 14 the support surfaces 98 of the cover board 36 are in register with the compartments 14 thereby supporting tokens 22 which have been placed in any of the compartments 14 so that they stand proud of the base member 11.

The knob 92 assists a marker in displacing the cover board 36 between its operative and inoperative positions within the cavity 34. The cover board 36 further includes angled checking formations 102 (see FIGS. 15 and 19) protruding from an upper surface 104 of the cover board 36 for checking the movement of the tokens 22 in certain circumstances. The checking formations 102 check movement of the cover board 36 when any of the tokens 22 are in their standby positions 68. Accordingly, the cover board 36 can only be displaced when all of the tokens 22 have been located in a selected compartment 14.

A lower surface 106 (see FIG. 20) of the cover board 36 has three grooves 108 for receiving and guiding the protuberances 82 of the marking board 24 thereby to align the marking board 24 in one of the selected predetermined orientations of the marking board 24 within the cavity 34. As discussed above, displacement of the cover board 36 within the cavity 34 either aligns the apertures 96 with the compartments 14 in the base member 11 or aligns the support surfaces 98 with the compartments 14 thereby preventing a token 22 from extending through the cover board 36 and into an aperture 25 in the marking board 24.

The marking board 24 (see FIGS. 22 to 25) is in the form of a flat disc with the apertures 25 extending therethrough. The apertures 25 are arranged in such positions that when a token 22 is positioned in an appropriate predetermined compartment 14 an appropriate aperture 25 is in alignment therewith. The marking board 24 has an upper side 110 (see FIGS. 22 and 23) and a lower side 112 (see FIG. 24). The marking board 24 has eight protuberances 82, four protuberances being located on each side 110, 112 of the marking board 24. The protuberances 82 are integrally formed with a body portion 114 of the marking board 24 and are spaced circumferentially and radially equidistant about the periphery of the marking board 24. Each side 110, 114 has indicators 116 which correspond to a specific set of question cards 37 (see FIG. 27) and the indicators 116 facilitate placing the marking board 24 in an appropriate orientation in which appropriate apertures 25 are placed in register with a single compartment 14 in each row or selection arrangement 51. In certain circumstances, a question book (not shown) is provided instead of the question cards 37.

As is the case in the embodiment depicted in FIGS. 1 to 4, in use, a pupil or user of the educational apparatus 10 is provided with a set of instructions 35 (see FIG. 27) which provides an explanation as to how the apparatus 10 is to be used. The user is also provided with a set of question cards 37 wherein each question card corresponds to an indicator 116 on the marking board 24 to ensure that the marking board 24 is appropriately orientated for its associated question card 37. The appropriate indicator 116 is visible through the indentation 60 in the base member 11 and a further indentation 61 in the cover board 36. Selected apertures 25 on the marking board 24 are in register with compartments 14 associated with correct answers of the questions on the question card 37 and, body portions 114 are in register with compartments 14 associated with incorrect answers.

Initially, all the tokens 22 are located in their standby positions 68. The pupil then reads the first question on the question card 37 and selects what he considers to be the appropriate answer to the first question and he then positions the token 22 associated with that question, which is indicated by the markings 17, into a selected compartment 14. This procedure is repeated until all ten questions (each question being designated by a marking 17) have been answered and, accordingly, all ten tokens have been placed in what the pupil considers to be the correct compartments 14. At this stage, the cover board 36 is fully inserted within the cavity 34 and in its operative position so that the support surfaces 98 of the cover board 36 are in register with the compartments 14 thereby supporting the tokens 22 in the selected compartments 14 so that the grasping formation 22.2 of tokens 22 stand proud of the base member 11.

Preferably upon completion of the exercise, the marking board 24 is inserted into the cavity 34 in an appropriate orientation dictated by the indicators 116 and corresponding with an associated question card 37. The cover board 36 may then be displaced outwardly of the cavity 34 by means of the knob 92 into its inoperative position so that the support surfaces 98 are displaced out of register with the compartments 14 and the apertures 96 are displaced in register with the compartments 14. When the apertures 96 are in register with the compartments 14, the tokens 22 are free to drop under the influence of gravity through the apertures 96 in the cover board 36 so that the token retaining formations 22.3 are free to engage the marking board 24 or be received within apertures 25. Those tokens 22 which have been correctly placed in accordance with the question cards 37 would be aligned with an aperture 25 in the marking board 24 and, accordingly, would fall under the influence of gravity through an appropriate aperture 25, and the gripping portions 22.2 would be received within the compartments 14. However, those tokens 22 which have been incorrectly located would not be in alignment with an aperture 25 and accordingly abut the body portion 114 of the marking board 24 and stand proud of the base member 11 thereby indicating an incorrectly answered question.

In the description above, the marking board 24 was received within the cavity 34 prior to a pupil carrying out the exercise. However, it is to be appreciated, that the marking board 34 may be inserted into the cavity 34 after the exercise has been completed. As the cover board 36 is displaceable between a position in which all the tokens 22 are supported in their selected compartments 14, and a position in which the tokens 22 are free to abut the marking board 24, the entire exercise may first be completed whereupon by displacement of the cover board 36 the correct answers that a user has selected may readily be obtained.

Typically, the apparatus 10 is made from a synthetics plastics material or any other suitable material. The various components may for example be formed by moulding or by machining.

The Applicant believes that as the tokens 22 are held sufficiently captive within the compartments 14 and the guide channels 50 in the embodiment of the invention depicted in FIGS. 6 to 26, the likelihood of a user losing the tokens 22 is reduced. Further, the Applicant believes that as the marking board 24 may be inserted into the cavity 34 after the user has completed the exercise, the likelihood of a user with devious intent being able to ascertain the correct answers from the marking board 24 is reduced. The Applicant believes still further that the educational apparatus 10 provides a simple yet cost effective means for answering a series of questions provided on the question cards 37.

What I claim is:

1. Educational apparatus which includes:

a base member having a plurality of selection arrangements, each selection arrangement being formed by at least two compartments located in the base member and being interconnected by a guide channel; and a plurality of tokens respectively operatively associated with said selection arrangements, each said token being locatable in a selected one of said compartments only of the associated selection arrangement.

2. Educational apparatus as claimed in claim 1, which includes marking means for assessing the location of said tokens within the selection arrangements.

3. Educational apparatus as claimed in claim 2, in which the marking means is in the form of a marking board having a plurality of apertures selectively located therein, each aperture corresponding to a selection arrangement and configured to identify said tokens when placed in predetermined in the selection arrangements in use.

4. Educational apparatus as claimed in claim 2, which includes a cover board which is locatable between the base member and the marking means, the cover board being displaceable between an operative position in which said tokens are supported by the cover board and an inoperative position in which the tokens are not supported by the cover board.

5. Educational apparatus as claimed in claim 4, which includes holding means attached to the base member, the holding means defining a cavity in which the marking means and the cover board are receivable and held in use.

6. Educational apparatus as claimed in claim 5, in which the holding means and the cover board have complementary guide formations thereby to guide displacement of the cover board between its operative and inoperative positions.

7. Educational apparatus as claimed in claim 5, in which the holding means and the marking means have complementary guide formations for guiding location of the marking means relative to the base member.

8. Educational apparatus as claimed in claim 4, which includes checking formations for operatively checking displacement of the cover board from its operative position when said tokens are not all located in said compartments.

9. Educational apparatus as claimed in claim 8, in which the cover board includes a plurality of apertures corresponding in number to the number of compartments, the cover board being configured so that each said aperture is in register with a respective said compartment when the cover board is in its inoperative position.

10. Educational apparatus as claimed in claim 2, in which the selection arrangements are arranged in parallel rows.

11. Educational apparatus as claimed in claim 1, in which each of said tokens has a retaining formation for retaining the token within its associated selection arrangement and preventing removal therefrom.

12. A marking board for use in educational apparatus as claimed in claim 1, the marking board including a body portion having a plurality of apertures defined therein, each aperture being located in a preselected position and configured in use to identify a particular location of a respective one of said tokens of the apparatus;

a plurality of indicators provided on the body portion for indicating a predetermined orientation of the marking board relative to a base member of the apparatus; and guide formations for guiding location of the marking board relative to the base member.

13. Educational apparatus as claimed in claim 7, in which the marking means is removably insertable into the apparatus.

14. Educational apparatus as claimed in claim 1, wherein said base member is provided with a plurality of recesses corresponding to said selection arrangements, said recesses constituting standby positions for said plurality of tokens, said recesses each being connected to said compartments and said guide channel of the corresponding said selection arrangement.

15. Educational apparatus as claimed in claim 1, wherein said at least two compartments of each selection arrangement are connected by the respective guide channel of the same selection arrangement and are unconnected to the compartments of the other selection arrangements.

* * * * *